United States Patent
Landecker et al.

[11] Patent Number: 5,204,818
[45] Date of Patent: Apr. 20, 1993

[54] SURVEYING SATELLITE APPARATUS

[75] Inventors: Peter B. Landecker, Manhattan Beach, Calif.; Richard C. Savage, Franktown, Colo.

[73] Assignee: The United States of America as represented by the Secretary of the Air Force, Washington, D.C.

[21] Appl. No.: 883,229

[22] Filed: May 7, 1992

Related U.S. Application Data

[63] Continuation-in-part of Ser. No. 527,234, May 22, 1990, abandoned.

[51] Int. Cl.[5] .............................................. B64G 1/36
[52] U.S. Cl. ................................ 364/459; 364/455; 244/164; 244/171; 358/103
[58] Field of Search ............... 364/455, 459; 358/103, 358/109; 244/158 R, 164, 171, 172

[56] References Cited

U.S. PATENT DOCUMENTS

| | | | |
|---|---|---|---|
| 3,521,835 | 7/1970 | Braga-Illa et al. | 244/1 |
| 3,636,330 | 1/1972 | Holeman et al. | 364/455 |
| 3,744,740 | 7/1973 | Godin et al. | 244/3.19 |
| 3,749,914 | 7/1973 | Terasaki | 250/83.3 H |
| 4,617,634 | 10/1986 | Izumida et al. | 244/164 |
| 4,658,361 | 4/1987 | Kosaka et al. | 364/459 |
| 4,679,753 | 7/1987 | Landecker | 244/171 |
| 4,688,091 | 8/1987 | Kamel et al. | 358/109 |
| 4,688,092 | 8/1987 | Kamel et al. | 358/109 |
| 4,730,798 | 3/1988 | Wertz | 244/164 |
| 4,746,976 | 5/1988 | Kamel et al. | 358/103 |
| 4,883,244 | 11/1989 | Challoner et al. | 244/171 |

OTHER PUBLICATIONS

Landecker, P. B., "Operational Spacecraft Attitude Determination Using Data from a Spinning Sensor", The Journal of Astronautical Sciences, vol. 32, No. 2, Apr.–Jun. 1984, pp. 189–198.

Primary Examiner—Gary Chin
Attorney, Agent, or Firm—John B. Brocki; Donald J. Singer

[57] ABSTRACT

A surveying satellite apparatus having an on-board microprocessor to process sensor-provided data from planetary and/or celestial reference scene. The sensor data is compared with the on-board spacecraft database to determine if any misorientation or translation error is present. The spacecraft attitude and ephemeris solutions are autonomously updated to reflect the realtime alignment.

8 Claims, 1 Drawing Sheet

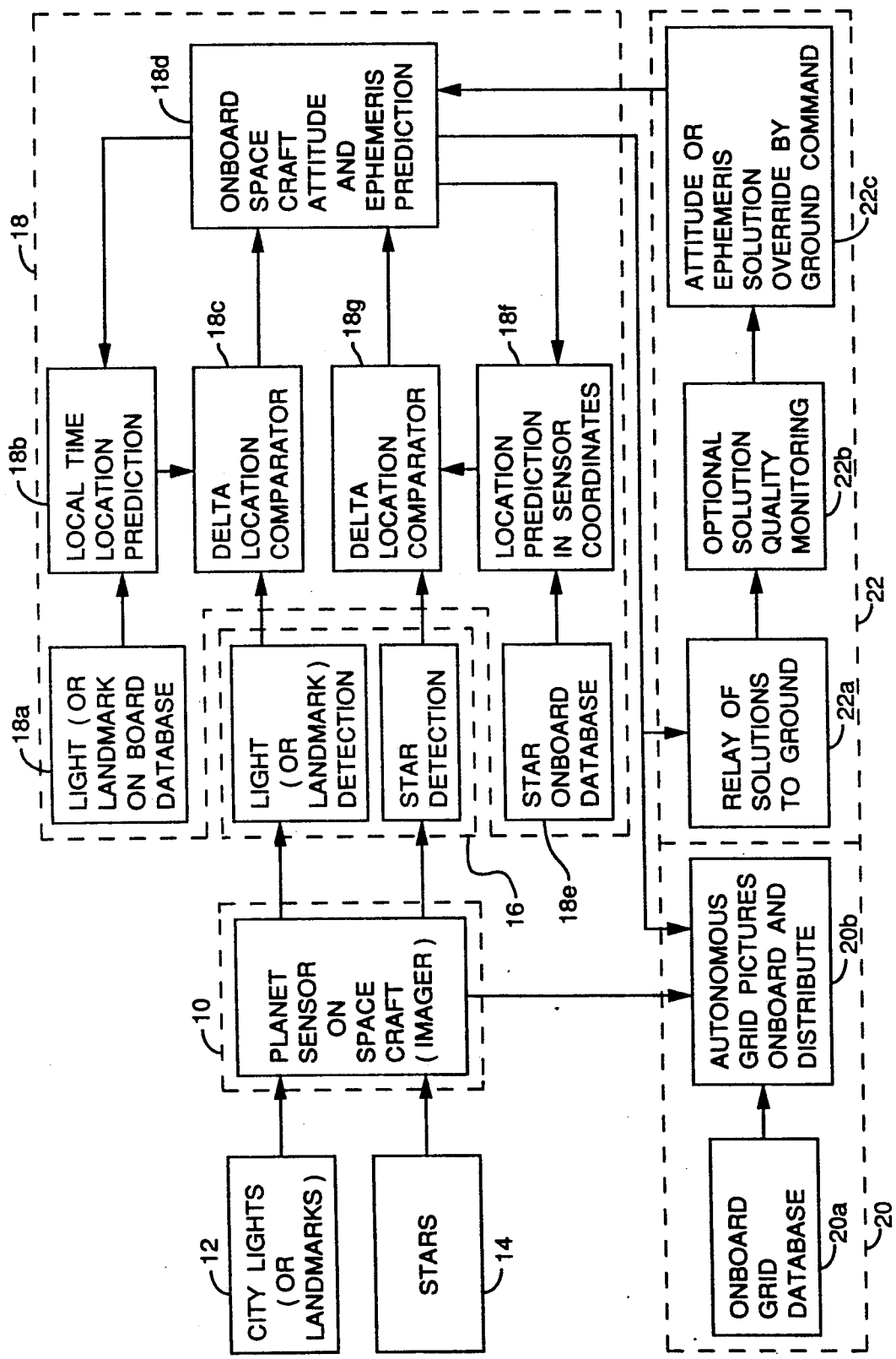

SURVEYING SATELLITE APPARATUS

STATEMENT OF GOVERNMENT INTEREST

The invention described herein may be manufactured and used by or for the Government for governmental purposes without the payment of any royalty thereon.

This application is a continuation-in-part of application Ser. No. 07/527,234, filed May 22, 1990, now abandoned.

BACKGROUND OF THE INVENTION

The present invention relates broadly to a surveying satellite apparatus, and in particular to an apparatus for autonomously updating on-board attitude determination and navigation solutions.

The state of the art of surveying satellites is well represented and alleviated to some degree by the prior art apparatus and approaches which are contained in the following U.S. Patents:

U.S. Pat. No. 3,521,835 issued to Braga-Illa et al on Jul. 28, 1970;

U.S. Pat. No. 3,744,740 issued to Godin et al on Jul. 10, 1973;

U.S. Pat. No. 3,749,914 issued to Terasaki on Jul. 31, 1973; and

U.S. Pat. No. 4,679,753 issued to Landecker on Jul. 14, 1987.

The Braga-Illa et al patent is directed to a control system for synchronous satellites which produces control signals with the coincidence of optical signals from two celestial bodies and an ephemeris corrected time signal corresponding to a segment of an orbit with a programmed on-board impulse rocket response to said signals to maintain orbit synchronism.

The Godin et al patent describes a navigation apparatus for a stellar vehicle on which a pair of stellar detectors are fixedly mounted and their respective optical axes are directed to different stars.

The Terasaki patent discusses an apparatus to control the alignment of the spin axis of a communications satellite with the major axis of an eccentric, near polar orbit. The on-board prediction of the time of apogee passage and autonomous control at apogee for the spin axis alignment with the local vertical is also provided.

The Landecker patent discloses a system for surveying features of a planet in which an earth imaging sensor is alternately directed at the earth and a predetermined star field. The optical detections are converted to electronic signals by a sensor electronics module (332). The outputs of the sensor electronics module corresponding to the times when the sensor is directed toward earth are processed by a signal processor (336), the output of which is a data stream which permits image reconstruction by a ground station computer. The outputs of the sensor electronics module corresponding to the times when the sensor is directed toward the star field are directed through on-board star detection thresholding electronics.

At this time, spacecraft either use ephemeris solutions updated by ground command (e.g., ranging by ground command) or analysis of planet images recorded over time by the sensor and determination of updated navigation predictions using computers on the ground or use external (e.g., Global Positioning System) spacecraft inputs. National Oceanic and Atmospheric Administration (NOAA) currently uses landmarks and has in the past used ranging with its GOES series of weather satellites to predict the location of the spacecraft for about a day in advance. Computers on the ground are used to analyze apparent shifts in the location of the landmarks, determine the spacecraft ephemeris, and geographically grid the sensor data; again, no on-board data processing is done. Similarly, no on-board processing is performed to determine the location of the DMSP weather satellite or geographically locate its sensor pixels. In both of the above cases, it is required that the ground stations remain operational (in conflict with some military system assumptions). Spacecraft location using GPS is possible but requires the survival of a significant part of the GPS constellation as well as the weight, power and cost of adding special GPS receivers to a spacecraft. The current series of DMSP weather satellites has an electro-optical sensor sensitive enough to detect city lights and stars at night, but does not process any of this information on-board the spacecraft in order to automatically determine spacecraft location and attitude.

There is a need to allow a spacecraft to operate autonomously in order to reduce system operations cost as well as to permit military satellites to operate normally without ground control for extended periods of time.

While the above-cited references are instructive, there still remains a need to provide a surveying satellite apparatus which autonomously updates on-board spacecraft attitude and ephemeris solutions. The present invention is intended to satisfy that need.

SUMMARY OF THE INVENTION

The present invention utilizes on-board spacecraft sensor data processing to autonomous update the on-board attitude determination and navigation solutions independent of any planet ground stations or other spacecraft. Automatic detection of city (or other artificial) lights or landmarks by a planet imaging sensor on a spacecraft, and use of this data to autonomously update the on-board spacecraft ephemeris and attitude determination solutions (as a function of time). On-board computers (e.g., microprocessors) are used to periodically compare the realtime sensor imaging data with predicted locations at satellite local time based on a stored catalog of landmark reference data (expected brightness at selected planet locations) and autonomously update spacecraft ephemeris solutions. Autonomously generated spacecraft navigation solutions can then maintain reliable spacecraft sensor data gridding (ground data location) accuracy for periods of months or even years, without a functioning ground station. Even in this extreme case, useful plant imaging data (with respect to planet coordinates) can continue to be relayed directly from the satellite to data users. Without such automatic periodic updates to the spacecraft navigation solutions, the accuracy of the sensor data gridding will eventually degrade to unacceptable levels of uncertainty.

This apparatus may also be used in conjunction with some type of autonomous spacecraft attitude determination method in which the imaging sensor autonomously compares locations of observed stars and predicted locations based on an on-board star catalog and attitude prediction hardware and software.

It is one object of the present invention, therefore, to provide an improved surveying satellite apparatus with an on-board attitude and ephemeris solution microprocessor.

It is another object of the invention to provide an improved surveying satellite apparatus wherein the spacecraft attitude is accurately determined independent of the spacecraft location.

It is yet another object of the invention to provide an improved surveying satellite apparatus which periodically compares the realtime sensor imaging data with a stored catalog of landmark reference data to autonomously update spacecraft ephemeris solutions.

It is still another object of the invention to provide an improved surveying satellite apparatus which utilizes the automatic detection of city lights or landmarks to autonomously determine the spacecraft attitude.

It is yet another object of the invention to provide an improved surveying satellite apparatus which maintains accurate spacecraft sensor data gridding without a functioning ground station.

These and other advantages, objects and features of the invention will become more apparent after considering the following description taken in conjunction with the illustrative embodiment in the accompanying drawings.

BRIEF DESCRIPTION OF THE DRAWING

The sole FIGURE is a block diagram of surveying satellite apparatus with an on-board attitude and ephemeris microprocessor and on-board landmark, star, and optional data gridding database according to the present invention.

DESCRIPTION OF THE PREFERRED EMBODIMENT

Referring now to FIG. 1, there is shown a block diagram of the surveying satellite apparatus utilizing the on-board spacecraft sensor unit 10 to receive input optical signals from either planetary sources such as city lights or landmarks 12, or celestial objects, such as stars 14. The spacecraft sensor unit 10 may comprise either a single sensor or an array of sensor units. The optical signals are detected and converted to electrical signals by the detection unit 16. The detection unit 16 may comprise a single detector unit to detect on a time-share basis the optical signals from the planetary and the celestial sources, or may comprise an array of detector units which are dedicated to receiving signals from a particular sensor only. It should also be well understood that any desired combination of the above components could also be utilized.

An on-board attitude/ephemeris microprocessor unit 18 receives the electrical signals from the detector unit 16. The microprocessor unit 18 includes a light or landmark database unit 18a, a local time location prediction unit 18b, and a delta location comparator unit 18c from which units, the spacecraft attitude and ephemeris prediction microprocesser 18d determine the spacecraft's attitude. The microprocessor unit 18 also includes a star database unit 18e, a sensor coordinates location prediction unit 18f and a delta location comparator unit 18g. These units 18c–18g are utilized by the spacecraft attitude and ephemeris prediction microprocessor 18d to determines and update the spacecraft based upon on-board stored ephemeris data and measured star locations.

A grid microprocessor unit 20 is utilized to store an on-board grid database and to process the periodically received planetary and celestial data signals. The grid microprocessor unit 20 utilizes on-board grid database 20a in conjunction with an autonomous grid pictures unit 20b to autonomously grid the pictures using offset data produced by the on-board satellite attitude and ephemeris prediction microprocessor, unit 18d. These gridded images can then be sent directly to data users. A ground operations unit 22 which comprises a relay of solutions to ground unit 22a, an optional solution quality monitoring unit 22b and a solution override unit 22c, receives data about the spacecraft attitude from the spacecraft attitude and ephemeris prediction microprocessor 18d. The update solution predictions are relayed to a ground operations which can monitor the solution quality and override it if necessary.

The surveying satellite apparatus with an on-board attitude and ephemeris solution microprocessor operates in the following manner. It is utilized to catalog and store the coordinates and expected brightnesses of artificial lights on the surface of a planet and/or shapes of landmarks in an on-board computer (i.e., microprocessor) database. It uses the electro-optical planet imaging sensor to detect lights at night or landmarks during the day. The on-board microprocessor is used to predict the location of these lights and/or landmarks and periodically compare the location of this predicted data with realtime sensor images. The prediction is accomplished by using the last iterative solution of the satellite's previous position, velocity and time elapsed since the last onboard solution of satellite velocity. A few very bright lights (e.g. from large cities) can be used at night for gross location solutions, and many dimmer, smaller nearby lights can be used for precise determination of the onboard navigation and attitude solutions. The onboard microprocessor is used to analyze apparent shifts in the location of the landmarks, and determine the satellite ephemeris. During the day, another option is to use landmark pattern recognition chips. In addition, the last satellite attitude solution, and an onboard model of the new satellite attitude is used in conjunction with the navigation prediction to estimate the sensor field of view and orientation at a later time, along with the associated calculated city light and landmark locations within the field of view. The on-board microprocessor autonomously determines whether the realtime images have a significant amount of obscuration by planet clouds, and automatically rejects any obscured data. The onboard microprocessor is programmed to periodically determine if some minimum number and location of lights and/or landmarks are visible in a particular picture, such as three areas on the ground sufficiently separated in two dimensions, and to use this information to update the onboard navigation solution. If there is a clear enough view of lights and/or landmarks, the onboard microprocessor compares the latest real-time images with the stored onboard data base, and determines the differences between the projected sensor attitude and satellite navigation solutions and the latest real time observation. The microprocessor automatically determines which landmarks are visible by simple match/no match criteria. Based on this comparison, the onboard microprocessor automatically uses any data determined to meet the programmed visibility threshold requirements to update the satellite attitude and ephemeris onboard projected solutions independent of ground control or intervention. The size of the onboard global data base and the frequency of the update process is determined by the probability of obscuration and the required accuracy of the navigation and attitude determination solutions with respect to the pixel size of the electro-optical sensor. The microprocessor can also be used to automatically grid downlinked images with geopolitical boundaries or other coordinates superimposed thereon. In the onboard database, grid points are imbedded into the expected geographical images, e.g., along expected land/sea and country border boundaries. After the onboard microprocessor determines that there is a good navigation/attitude solution, i.e., that offsets have been found so that the city light centroids in the just recorded picture match their locations in the onboard data base, then those geopolitical grid points can be superimposed on the appropriate picture pixels prior to transmission to the ground. The ground stations, when they are operating, can monitor and verify the spacecraft autonomous navigation operation, and override the on-board spacecraft attitude and navigation solutions, using a ground computer and transmitter, if desirable or necessary.

A few very bright lights (e.g., from large cities) can be used at night for gross location solutions, and many dimmer, smaller, nearby lights can be used for the precise determination of the on-board navigation and attitude solutions. During the day, another option is to use landmark pattern recognition chips. The size of the on-board global database and the frequency of the update process is determined by the probability of obscuration and the required accuracy of the navigation and attitude determination solutions with respect to the pixel size of the electro-optical sensor.

In addition, the present apparatus may be incorporated into or used in conjunction with the system that is shown in U.S. Pat. No. 4,679,753, "Surveying Satellite Incorporating Star-Sensing Attitude Determination Subsystem", issued Jul. 14, 1987, to Peter B. Landecker. A variation of this autonomous landmark-sensing invention would include the on-board star location and amplitude database, and the on-board computer (e.g., microprocessor) to automatically compare the location of a star detected realtime with that predicted by the sensor attitude determination solution in conjunction with the on-board star database. The difference between the predicted and actual locations is then used to update the on-board sensor attitude prediction solution. Since the location of the stars is unchanged independent of the spacecraft location, this star data can be used to determine the sensor attitude independent of its location around the planet. This quick and precise autonomous attitude solution can then be used in conjunction with the sensor artificial light and/or landmark data apparatus to accurately and autonomously determine the satellite ephemeris.

Although the invention has been described with reference to a particular embodiment, it will be understood by those skilled in the art that the invention is capable of a variety of alternative embodiments within the spirit and scope of the appended claims.

What is claimed is:

1. A surveying satellite apparatus with an on-board attitude and ephemeris solution microprocessor comprising in combination:

means for sensing at least one optical signal from a reference point, said sensing means providing a reference signal corresponding to each optical signal, means for detecting and converting each reference signal to an electrical signal, means for processing said electrical signals, said means for processing signals including a database, said database containing the characteristics of navigation references, said means for processing signals correlating said electrical signals to location prediction data to establish a frame of reference, said means for processing signals comparing said electrical signals with said frame of reference to establish attitude difference signals, said attitude difference signals are utilized by said means for processing signals to update attitude data of the satellite, and, means for establishing a grid database, said grid database means storing a grid database, said means for processing signals receiving and converting said reference signals to a visual display, said means for processing signals superimposing said grid database on said visual display to provide grid graphics, said means for processing signals applying a grid correction signal to said grid database means, said grid correction signal utilized by said means for processing signals to update ephemeris data of the satellite.

2. A surveying satellite apparatus as described in claim 1 further including means for ground control, said ground control means receiving attitude difference signals from said means for processing signals, said ground control means monitoring said attitude difference signals, said ground control means including means for generating an override command using a ground computer and transmitter.

3. A surveying satellite apparatus as described in claim 1 wherein said reference point comprises city lights.

4. A surveying satellite apparatus as described in claim 1 wherein said reference point comprises a landmark.

5. A surveying satellite apparatus as described in claim 1 wherein said means for processing signals comprises a microprocessor unit to receive said attitude difference signals and to update stored attitude and ephemeris data in response thereto.

6. A surveying satellite apparatus as described in claim 1 wherein said means for sensing optical signals comprises a single optical sensor which is operated on a time-shared basis to sense a number of different reference scenes.

7. A surveying satellite apparatus as described in claim 1 wherein said means for sensing optical signals comprises a plurality of optical sensing means which are respectively dedicated to a different reference scene.

8. A surveying satellite apparatus as described in claim 1 wherein said reference point comprises a star.

* * * * *